(12) United States Patent
Gonser (10) Patent No.: US 9,514,117 B2
(45) Date of Patent: Dec. 6, 2016

(54) SYSTEM AND METHOD FOR DOCUMENT TAGGING TEMPLATES

(75) Inventor: Thomas H. Gonser, Bellevue, WA (US)

(73) Assignee: DocuSign, Inc., San Francisco, CA (US)

( * ) Notice: Subject to any disclaimer, the term of this patent is extended or adjusted under 35 U.S.C. 154(b) by 1985 days.

(21) Appl. No.: 12/038,728

(22) Filed: Feb. 27, 2008

(65) Prior Publication Data

US 2008/0209313 A1    Aug. 28, 2008

Related U.S. Application Data

(60) Provisional application No. 60/892,161, filed on Feb. 28, 2007.

(51) Int. Cl.
*G06F 17/24* (2006.01)

(52) U.S. Cl.
CPC .................. *G06F 17/248* (2013.01)

(58) Field of Classification Search
CPC ........... G06F 3/03545; G06F 3/04883; G06F 3/0488; G06F 17/243; G06F 17/242; G06F 17/248
USPC .......... 715/204, 222, 255; 713/176; 709/218
See application file for complete search history.

(56) References Cited

U.S. PATENT DOCUMENTS

| | | |
|---|---|---|
| 5,040,142 A | 8/1991 | Mori et al. |
| 5,220,675 A | 6/1993 | Padawer et al. |
| 5,222,138 A | 6/1993 | Balabon et al. |
| 5,337,360 A | 8/1994 | Fischer |
| 5,390,247 A | 2/1995 | Fischer |
| 5,465,299 A | 11/1995 | Matsumoto et al. |
| 5,544,255 A | 8/1996 | Smithies et al. |
| 5,553,145 A | 9/1996 | Micali |
| 5,615,268 A | 3/1997 | Bisbee et al. |
| 5,629,982 A | 5/1997 | Micali |

(Continued)

FOREIGN PATENT DOCUMENTS

| | | |
|---|---|---|
| CN | 101299256 | 11/2008 |
| EP | 1238321 | 6/2001 |

(Continued)

OTHER PUBLICATIONS

Wheeler et al., "DocuSign Unveils new Scalable Product and Support Offerings of Electronic Signature and Electronic Contract Execution," DocuSign the fastest way to get a signature, 2 pp., Jan. 2008.

(Continued)

*Primary Examiner* — Kavita Padmanabhan
*Assistant Examiner* — Brian Garmon
(74) *Attorney, Agent, or Firm* — Schwegman Lundberg & Woessner, P.A.

(57) ABSTRACT

The present invention provides a system and method for tagging digital documents. A method for creating digitally tagged documents includes creating a data template for a digital document, assigning signature locations and data fields in the data template, and linking the template instructions with the digital document. A system for creating digitally tagged documents includes a processor; a display; and a memory containing stored programming instructions operable by the processor to create a data template for a digital document, assign signature locations and data fields in the data template, and link template instructions with the digital document.

19 Claims, 9 Drawing Sheets

(56) References Cited

U.S. PATENT DOCUMENTS

| | | |
|---|---|---|
| 5,689,567 A | 11/1997 | Miyauchi |
| 5,748,738 A | 5/1998 | Bisbee et al. |
| 5,813,009 A | 9/1998 | Johnson et al. |
| 5,832,499 A | 11/1998 | Gustman |
| 5,872,848 A | 2/1999 | Romney et al. |
| 5,898,156 A | 4/1999 | Wilfong |
| 6,021,202 A | 2/2000 | Anderson et al. |
| 6,067,531 A | 5/2000 | Hoyt et al. |
| 6,085,322 A | 7/2000 | Romney et al. |
| 6,092,080 A | 7/2000 | Gustman |
| 6,119,229 A | 9/2000 | Martinez et al. |
| 6,128,740 A | 10/2000 | Curry et al. |
| 6,161,139 A | 12/2000 | Win et al. |
| 6,185,587 B1 | 2/2001 | Bernardo et al. |
| 6,185,683 B1 | 2/2001 | Ginter et al. |
| 6,199,052 B1 | 3/2001 | Mitty et al. |
| 6,210,276 B1 | 4/2001 | Mullins |
| 6,237,096 B1 | 5/2001 | Bisbee et al. |
| 6,289,460 B1 | 9/2001 | Hajmiragha |
| 6,321,333 B1 | 11/2001 | Murray |
| 6,327,656 B2 | 12/2001 | Zabetian |
| 6,367,010 B1 | 4/2002 | Venkatram et al. |
| 6,367,013 B1 | 4/2002 | Bisbee et al. |
| 6,446,115 B2 | 9/2002 | Powers |
| 6,470,448 B1 | 10/2002 | Kuroda et al. |
| 6,584,466 B1 | 6/2003 | Serbinis et al. |
| 6,615,348 B1 | 9/2003 | Gibbs |
| 6,658,403 B1 | 12/2003 | Kuroda et al. |
| 6,671,805 B1 * | 12/2003 | Brown et al. .................. 713/176 |
| 6,728,762 B1 * | 4/2004 | Estrada et al. ................. 709/218 |
| 6,751,632 B1 | 6/2004 | Petrogiannis |
| 6,754,829 B1 | 6/2004 | Butt et al. |
| 6,796,489 B2 | 9/2004 | Slater et al. |
| 6,807,633 B1 | 10/2004 | Pavlik |
| 6,829,635 B1 | 12/2004 | Townshend |
| 6,912,660 B1 | 6/2005 | Petrogiannis |
| 6,931,420 B1 | 8/2005 | Silvester et al. |
| 6,938,157 B2 | 8/2005 | Kaplan |
| 6,944,648 B2 | 9/2005 | Cochran et al. |
| 6,947,911 B1 | 9/2005 | Moritsu et al. |
| 6,959,382 B1 | 10/2005 | Kinnis et al. |
| 6,961,854 B2 | 11/2005 | Serret-Avila et al. |
| 6,973,569 B1 | 12/2005 | Anderson et al. |
| 6,990,684 B2 | 1/2006 | Futamura et al. |
| 7,039,805 B1 | 5/2006 | Messing |
| 7,059,516 B2 | 6/2006 | Matsuyama et al. |
| 7,069,443 B2 | 6/2006 | Berringer et al. |
| 7,093,130 B1 | 8/2006 | Kobayashi et al. |
| 7,100,045 B2 | 8/2006 | Yamada et al. |
| 7,103,778 B2 | 9/2006 | Kon et al. |
| 7,162,635 B2 | 1/2007 | Bisbee et al. |
| 7,167,844 B1 | 1/2007 | Leong et al. |
| 7,197,644 B2 | 3/2007 | Brewington |
| 7,237,114 B1 | 6/2007 | Rosenberg |
| 7,340,608 B2 | 3/2008 | Laurie et al. |
| 7,360,079 B2 | 4/2008 | Wall |
| 7,395,436 B1 | 7/2008 | Nemovicher |
| 7,424,543 B2 | 9/2008 | Rice, III |
| 7,437,421 B2 | 10/2008 | Bhogal et al. |
| 7,523,315 B2 | 4/2009 | Hougaard et al. |
| 7,533,268 B1 | 5/2009 | Catorcini et al. |
| 7,554,576 B2 | 6/2009 | Erol et al. |
| 7,562,053 B2 | 7/2009 | Twining et al. |
| 7,568,101 B1 | 7/2009 | Catorcini et al. |
| 7,568,104 B2 | 7/2009 | Berryman et al. |
| 7,581,105 B2 | 8/2009 | Dietl |
| 7,657,832 B1 | 2/2010 | Lin |
| 7,660,863 B2 | 2/2010 | Boursetty et al. |
| 7,788,259 B2 | 8/2010 | Patterson et al. |
| 7,934,098 B1 | 4/2011 | Hahn et al. |
| 7,953,977 B2 | 5/2011 | Maruyama et al. |
| 8,103,867 B2 | 1/2012 | Spitz |
| 8,132,013 B2 | 3/2012 | Meier |
| 8,286,071 B1 | 10/2012 | Zimmerman et al. |
| 8,588,483 B2 | 11/2013 | Hicks et al. |
| 8,612,349 B1 | 12/2013 | Ledder et al. |
| 2001/0018739 A1* | 8/2001 | Anderson et al. ............ 713/176 |
| 2001/0034739 A1 | 10/2001 | Anecki et al. |
| 2001/0034835 A1 | 10/2001 | Smith |
| 2002/0004800 A1 | 1/2002 | Kikuta et al. |
| 2002/0019937 A1 | 2/2002 | Edstrom et al. |
| 2002/0026427 A1 | 2/2002 | Kon et al. |
| 2002/0026582 A1 | 2/2002 | Futamura et al. |
| 2002/0040431 A1 | 4/2002 | Kato et al. |
| 2002/0069179 A1 | 6/2002 | Slater et al. |
| 2002/0069358 A1 | 6/2002 | Silvester |
| 2002/0129056 A1 | 9/2002 | Conant et al. |
| 2002/0138445 A1 | 9/2002 | Laage et al. |
| 2002/0143711 A1 | 10/2002 | Nassiri |
| 2002/0162000 A1 | 10/2002 | Bensler |
| 2002/0178187 A1 | 11/2002 | Rasmussen et al. |
| 2002/0184485 A1 | 12/2002 | Dray et al. |
| 2002/0194219 A1* | 12/2002 | Bradley et al. ................ 707/506 |
| 2002/0196478 A1 | 12/2002 | Struble |
| 2003/0048301 A1 | 3/2003 | Menninger |
| 2003/0051016 A1 | 3/2003 | Miyoshi et al. |
| 2003/0078880 A1 | 4/2003 | Alley et al. |
| 2003/0120553 A1 | 6/2003 | Williams |
| 2003/0120930 A1 | 6/2003 | Simpson et al. |
| 2003/0131073 A1 | 7/2003 | Lucovsky et al. |
| 2003/0140252 A1 | 7/2003 | Lafon et al. |
| 2003/0217275 A1 | 11/2003 | Bentley et al. |
| 2004/0054606 A1 | 3/2004 | Broerman |
| 2004/0078337 A1 | 4/2004 | King et al. |
| 2004/0107352 A1 | 6/2004 | Yui et al. |
| 2004/0117627 A1 | 6/2004 | Brewington |
| 2004/0133493 A1 | 7/2004 | Ford et al. |
| 2004/0181756 A1* | 9/2004 | Berringer et al. ............ 715/530 |
| 2004/0225884 A1* | 11/2004 | Lorenzini ............ G06F 21/645 713/176 |
| 2004/0230891 A1 | 11/2004 | Pravetz et al. |
| 2004/0250070 A1 | 12/2004 | Wong |
| 2004/0255114 A1 | 12/2004 | Lee et al. |
| 2004/0255127 A1 | 12/2004 | Arnouse |
| 2005/0033811 A1 | 2/2005 | Bhogal et al. |
| 2005/0049903 A1 | 3/2005 | Raja |
| 2005/0076215 A1 | 4/2005 | Dryer |
| 2005/0091143 A1 | 4/2005 | Schmidt et al. |
| 2005/0120217 A1 | 6/2005 | Fifield et al. |
| 2005/0165626 A1 | 7/2005 | Karpf |
| 2005/0182684 A1 | 8/2005 | Dawson et al. |
| 2005/0182956 A1 | 8/2005 | Ginter et al. |
| 2005/0192908 A1 | 9/2005 | Jorimann et al. |
| 2005/0231738 A1 | 10/2005 | Huff et al. |
| 2006/0047600 A1 | 3/2006 | Bodenheim et al. |
| 2006/0161780 A1* | 7/2006 | Berryman et al. ............ 713/176 |
| 2006/0161781 A1 | 7/2006 | Rice et al. |
| 2006/0174199 A1 | 8/2006 | Soltis et al. |
| 2006/0205476 A1 | 9/2006 | Jubinville |
| 2006/0259440 A1 | 11/2006 | Leake et al. |
| 2006/0261545 A1 | 11/2006 | Rogers |
| 2006/0294152 A1 | 12/2006 | Kawabe et al. |
| 2007/0026927 A1 | 2/2007 | Yaldoo et al. |
| 2007/0079139 A1 | 4/2007 | Kim |
| 2007/0088958 A1 | 4/2007 | Qa'Im-maqami |
| 2007/0118732 A1 | 5/2007 | Whitmore |
| 2007/0130186 A1 | 6/2007 | Ramsey et al. |
| 2007/0136361 A1 | 6/2007 | Lee et al. |
| 2007/0143085 A1 | 6/2007 | Kimmel |
| 2007/0165865 A1 | 7/2007 | Talvitie |
| 2007/0198533 A1 | 8/2007 | Foygel et al. |
| 2007/0208944 A1 | 9/2007 | Pavlicic |
| 2007/0220260 A1 | 9/2007 | King |
| 2007/0271592 A1 | 11/2007 | Noda et al. |
| 2007/0289022 A1 | 12/2007 | Wittkotter |
| 2008/0016357 A1* | 1/2008 | Suarez .......................... 713/176 |
| 2008/0034213 A1 | 2/2008 | Boemker et al. |
| 2008/0097777 A1 | 4/2008 | Rielo |
| 2008/0141033 A1 | 6/2008 | Ginter et al. |
| 2008/0209313 A1 | 8/2008 | Gonser |
| 2008/0209516 A1 | 8/2008 | Nassiri |
| 2008/0216147 A1 | 9/2008 | Duffy |
| 2008/0235577 A1 | 9/2008 | Veluchamy et al. |
| 2008/0260287 A1 | 10/2008 | Berryman et al. |

(56) References Cited

U.S. PATENT DOCUMENTS

| | | |
|---|---|---|
| 2008/0313723 A1 | 12/2008 | Naono et al. |
| 2009/0024912 A1 | 1/2009 | McCabe et al. |
| 2009/0025087 A1 | 1/2009 | Peirson, Jr. et al. |
| 2009/0044019 A1 | 2/2009 | Lee et al. |
| 2009/0099881 A1 | 4/2009 | Hanna et al. |
| 2009/0132351 A1 | 5/2009 | Gibson |
| 2009/0138730 A1 | 5/2009 | Cook et al. |
| 2009/0145958 A1 | 6/2009 | Stoutenburg et al. |
| 2009/0185241 A1 | 7/2009 | Nepomniachtchi |
| 2009/0268903 A1 | 10/2009 | Bojinov et al. |
| 2009/0292786 A1 | 11/2009 | McCabe et al. |
| 2010/0088364 A1 | 4/2010 | Carter et al. |
| 2010/0122094 A1 | 5/2010 | Shima |
| 2010/0153011 A1 | 6/2010 | Obrea et al. |
| 2010/0217987 A1 | 8/2010 | Shevade |
| 2010/0235727 A1 | 9/2010 | Ashton et al. |
| 2010/0274863 A1 | 10/2010 | Foygel et al. |
| 2010/0287260 A1 | 11/2010 | Peterson et al. |
| 2010/0293094 A1 | 11/2010 | Kolkowitz et al. |
| 2011/0093769 A1 | 4/2011 | Dunn et al. |
| 2011/0119165 A1 | 5/2011 | Zee |
| 2011/0126022 A1 | 5/2011 | Sieberer |
| 2011/0238510 A1 | 9/2011 | Rowen et al. |
| 2011/0264907 A1 | 10/2011 | Betz et al. |
| 2011/0314371 A1 | 12/2011 | Peterson et al. |
| 2012/0180135 A1 | 7/2012 | Hodges et al. |
| 2012/0209970 A1 | 8/2012 | Scipioni et al. |
| 2012/0271882 A1 | 10/2012 | Sachdeva et al. |
| 2012/0304265 A1 | 11/2012 | Richter et al. |
| 2013/0019156 A1 | 1/2013 | Gonser et al. |
| 2013/0019289 A1 | 1/2013 | Gonser et al. |
| 2013/0050512 A1 | 2/2013 | Gonser et al. |
| 2013/0067243 A1 | 3/2013 | Tamayo-Rios et al. |
| 2013/0159720 A1 | 6/2013 | Gonser et al. |
| 2013/0179676 A1 | 7/2013 | Hamid |
| 2013/0254111 A1 | 9/2013 | Gonser et al. |
| 2013/0263283 A1 | 10/2013 | Peterson et al. |
| 2014/0019761 A1 | 1/2014 | Shapiro |

FOREIGN PATENT DOCUMENTS

| | | |
|---|---|---|
| JP | 2000048072 | 2/2000 |
| JP | 2003271529 | 9/2003 |
| JP | 2005267438 | 9/2005 |
| JP | 2008117258 | 5/2008 |
| JP | 2008225527 | 9/2008 |
| KR | 20000049674 | 8/2000 |
| KR | 1020020092595 | 12/2002 |
| KR | 1020070059931 | 6/2007 |
| KR | 100929488 | 12/2009 |
| KR | 20090122657 | 12/2009 |
| RU | 2400811 | 11/2005 |
| RU | 2291491 | 10/2007 |
| RU | 2300844 | 6/2010 |
| WO | 9607156 | 3/1996 |
| WO | 03091834 | 11/2003 |
| WO | 2007075235 | 7/2007 |
| WO | 2008124627 | 10/2008 |
| WO | 2009012478 | 1/2009 |
| WO | 2010105262 | 9/2010 |

OTHER PUBLICATIONS

Borozdin, "DocuSign Connect Service Guide," DocuSign, Inc., pp. 1-9, 2008.

"eLynx Adds Workflow Management to Electronic Document Platform—new Workflow Capabilities Provide for Enhanced Electronic Loan Processing," eLynx, http://www.elynx.com/news/view/82, 2 pp., Jan. 2009.

Harold, Elliotte Rusty. XML Bible. IDG Books Worldwide, Inc., 1999, p. 191-192.

Kamara et al., "Cryptographic Cloud Storage", 2010, Financial Cryptography and Data Security, p. 136-149.

Zefferer et al., "An Electronic-Signature Based Circular Resolution Database System," Mar. 2010, ACM, p. 1840-1845.

Su et al., "Signature-In-Signature Verification Via a Secure Simple Network Protocol", 2010, IEEE, p. 1-4.

Laurens Leurs; The history of PDF; Feb. 14, 2010; Prepressure. com; pp. 1-12.

Brown, "Digital Signatures: Can They Be Accepted as Legal Signatures in EID?", Dec. 1993, ACM, p. 86-92.

Herzberg et al., "Surf'N'Sign: Client Signatures on Web Documents", 1998, IEEE, vol. 37 Issue 1, p. 61-71.

Kwok et al., "An Automatic Electronic Contract Document Signing System in a Secure Environment", 2005, IEEE, p. 497-502.

* cited by examiner

SYSTEM AND METHOD FOR DOCUMENT TAGGING TEMPLATES

PRIORITY CLAIM

This application claims priority to and the benefit of the filing date of U.S. Provisional Application Ser. No. 60/892,161 filed Feb. 28, 2007, which is herein incorporated by reference in its entirety.

BACKGROUND OF THE INVENTION

Contracts and other legal documents requiring signatures are used daily in commerce. These documents need to be signed, stored and routed to the necessary location in a controllable fashion. As electronic documents and electronic signatures become more universally accepted and demanded there exists a need to create a signing process that is controlled electronically. Historically, electronic systems that allow for electronic document signature typically apply the signature to the entire document. Documents such as contracts are not marked up for specific signature locations, initial locations, data collection locations and other areas for signatures to appear in the proper locations. This lack of ability to mimic the paper process led to slow adoption. More recently, some newer electronic systems allow the user to place signing locations into the document but require the user to manually create the workflow and authentication steps for the document via time consuming and tedious processes, such as the insertion or creation of tag locations throughout the document where the signatures are to be placed. Therefore there exists a need for automating the process of placing exact signature locations, workflow, and recipient tasks into these documents so they can be sent for e-signature more easily, this is especially true for documents that contain multiple signing locations, multiple recipients and more complicated workflows.

SUMMARY OF THE INVENTION

Systems and methods for tagging digital documents are disclosed herein. A method for creating digitally tagged documents includes creating a data template for a digital document, assigning signature locations and data fields in the data template, and linking the template instructions with the digital document. A system for creating digitally tagged documents includes a processor; a display; and a memory containing stored programming instructions operable by the processor to create a data template for a digital document, assign signature locations and data fields in the data template, and link template instructions with the digital document.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Systems and methods for tagging digital documents includes a way for a contract or set of contracts to be "marked up" using signing templates that describe a "signing process" that the document follows in order to be executed as intended by the document originator. This process utilizes a combination of documents, which are distributed to signers, a companion file defining the intended signing events and workflow, and an application which manages and registers the events and enforces the signing flow. The companion document information may be stored inside the document file or the document file may be a component document inside the companion document.

In the preferred embodiment there exist two types of signing process templates: overlay templates and pre-tagged documents. Overlay templates include only the signing instructions, while pre-tagged documents include all signing instructions as well as the underlying document. A party to a transaction applies an overlay template to a new document that may contain different information each time, while the sender uses a pre-tagged document for documents that contain static information such as disclosures. Templates can be used by persons sending contracts or completed by the signer via a signing server, which prompts them for input.

An embodiment of the present invention is a system, method and computer program product for tagging digital documents. The present invention is preferably implemented as software components that are executed on a networked system, such as system 10 shown in FIG. 1, which illustrates a preferred embodiment of the present invention. The present invention may be implemented as stand-alone software components, for example delivered via Application Service Provider (ASP) technology, a web server, or integrated into a larger system. In one embodiment, a web server is computer a program running on a network that is able to receive and send commands from remote sender programs. The web server is preferably able to receive inbound documents, packages and templates, and evaluate them in order to process a document management process. System 10 includes a signing server 22 coupled to multiple customer systems 28 operated by customers over a public or private network 20. Signing server 22 includes a database 24 for storing documents, digital signatures, digital signature certificate information, document related information (such as history), and various other information related to transactions performed on the stored documents.

Figure 1:
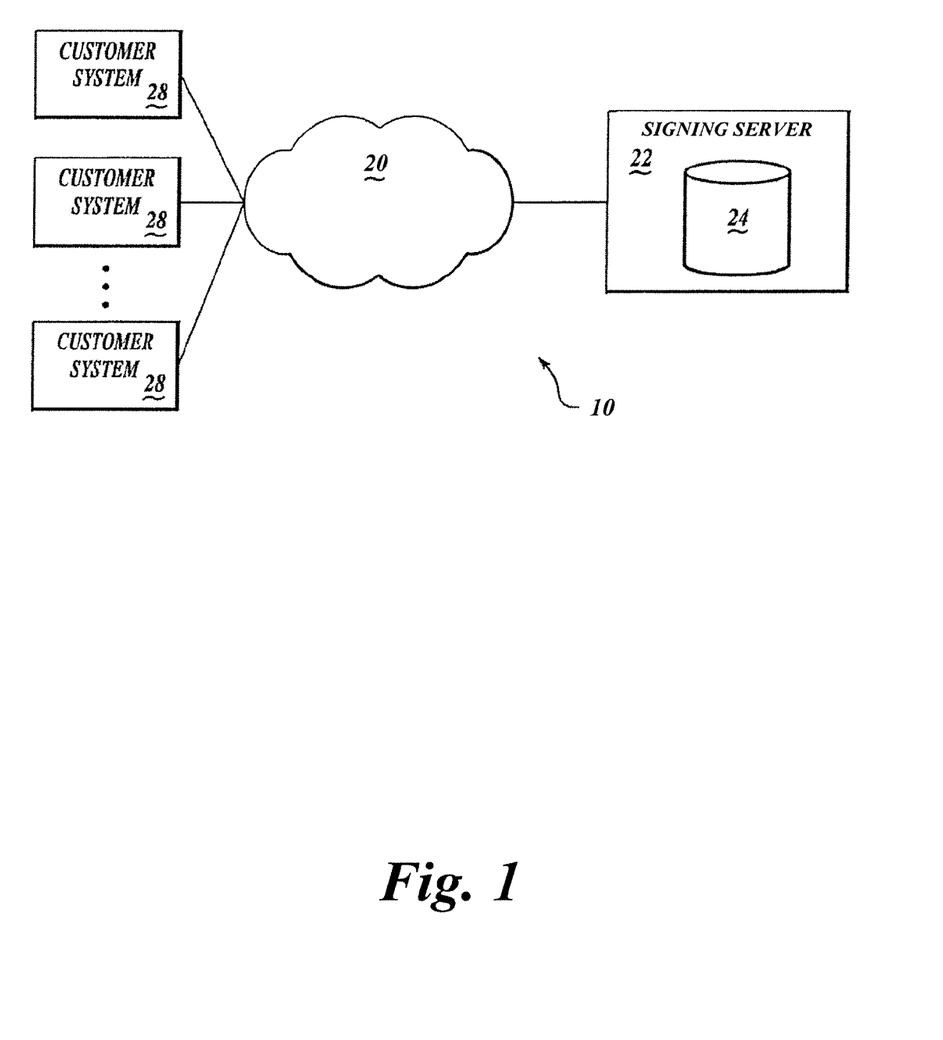
FIG. 1 is a block diagram showing components of the preferred embodiment of the present invention.

The connections between the various components of the present invention may be a wireless or non-wireless connection, or a combination of both. Customer system 28 may be a personal computer connected to a network service provider over a public switched telephone network, a cell phone or personal data assistant wirelessly connected to a network service provider, a digital pen or other device that is connectable to network 20.

Figure 2:
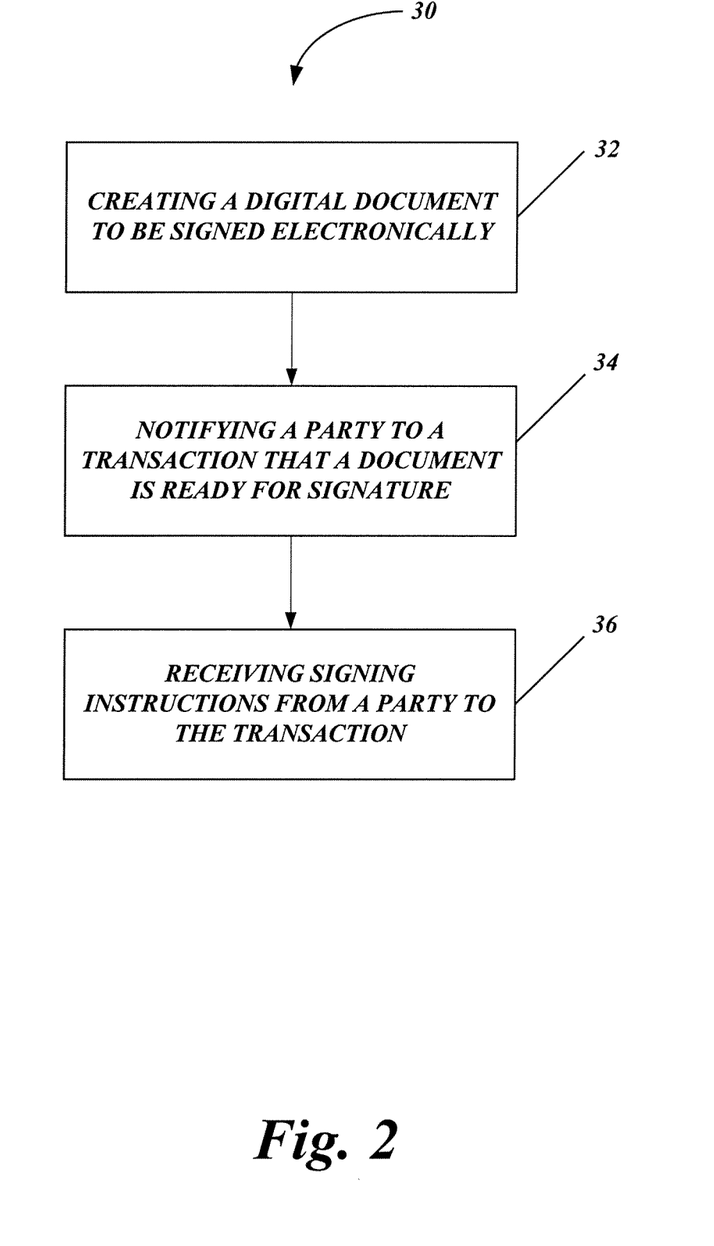
FIG. 2 is a flow diagram showing a preferred method for document tagging templates.

FIG. 2 is a flow diagram 30 showing a preferred method for document tagging templates. At block 32 a digital document is created to be signed electronically. In order to create a digital document, templates are used which are described in further detail with reference to FIG. 3 below. At block 34 a party to the transaction is notified that a document is ready for their signature, which is further described in FIG. 4 below. At block 36, signing instructions are received from a party to the transaction, which is further described in FIG. 5 below.

Figure 3:
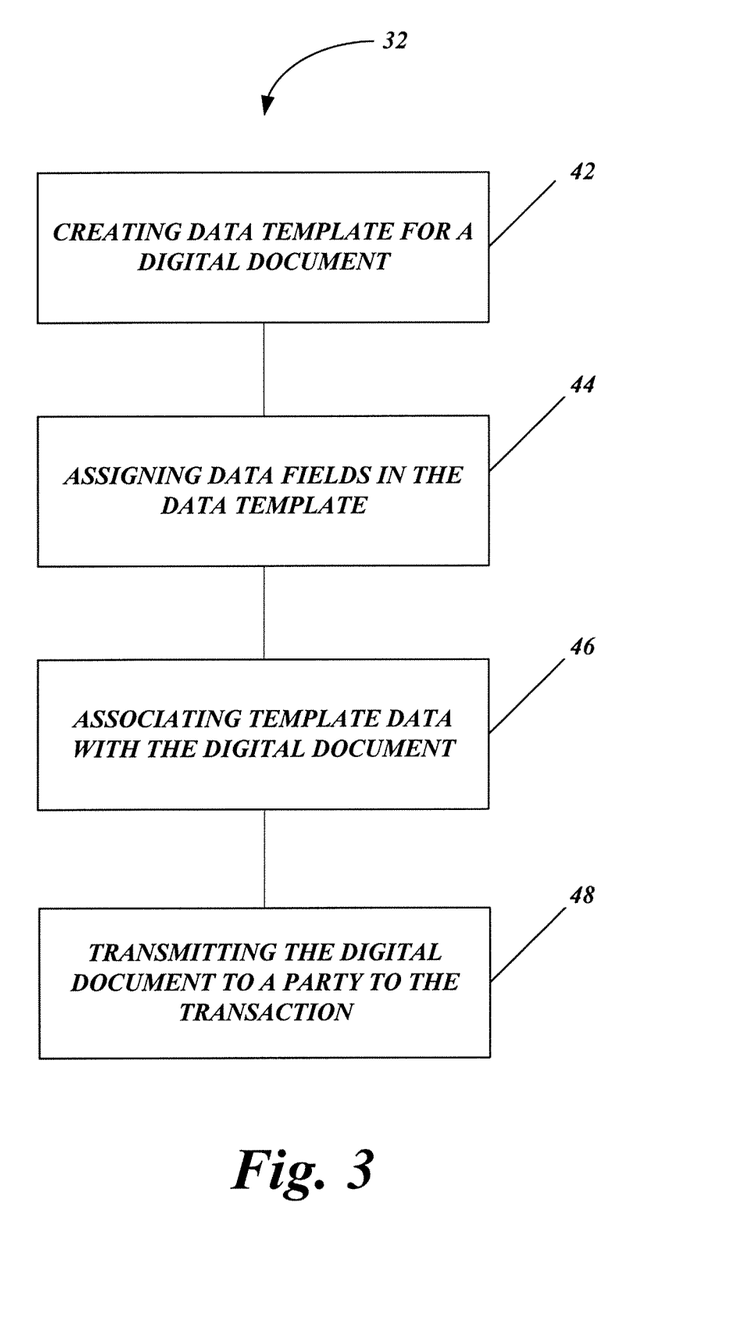
FIG. 3 is a flow diagram showing a preferred method of creating a document using template data.

FIG. 3 is a flow diagram 32 showing a preferred method of creating a document using template data. At block 42 a data template is created for a digital document. The template includes all the information needed to direct a signing process for a particular document or documents, and may be contained within the body or associated with files such as documents. Template information preferably includes some or all of the following data: transaction owner or source ID; recipients or roles of recipients who will be a party to the transaction (roles may be defined as required or optional and may be defined as locked and not changeable by the sender); authentication required for each recipient or role (may be single or multiple and may be applied to one or all); tasks that recipients will execute such as sign, review, approve, fill in data, or print; a list of "signing tabs" assigned for each recipient (signing tabs may be locked and/or required); association of workflow instructions, for example, the order in which the tabs are to be signed, the order in which the signers are to execute the contract, and the authentication levels being requested of each recipient; the role of each recipient as to signer, approver, reviewer, or final carbon copy; the sequence of delivery to individual recipients; locations of signatures and/or initials inside the document (locations can be relative to content in the document, like "anchors" (such as next to the text "Sign:"), or can be absolute (such as 100 pixels in and 300 pixels up on page 3 of document 1)); data collection fields and checkboxes; locations of data collection fields inside the document (locations can be relative to content in the document, like "anchors" (such as next to the text "Sign:"), or can be absolute (such as 100 pixels in and 300 pixels up on page 3 of document 1)), which data collection fields may include, for example, data that is presented to the signer to review and modify before execution of the document.

Templates may preferably be in, but not limited to any of the following forms: template only—contain signing instructions and no documents; pre-tagged document—a document or documents that includes signing instructions and the documents that are to be signed; and/or envelopes-a grouping of pre-tagged documents and standalone documents, or with associated templates. Template information can be stored in a variety of forms, such as XML or within the data structures of existing document types.

At block 44 signature locations and data fields are assigned in the data template. Signature fields are located where a party is asked to sign the document. Once the area is located a tab is entered to direct a party to the transaction to that location. Locations where a party is to initial are assigned as well as data fields such as date signed and printed name of the signer. In one embodiment the data fields are automatically entered by the system to ensure that the correct date is entered. At block 46 the template data is bound to the document. The template information as entered by the party and the document to be signed are merged. At block 48 the digital document, including the template, are sent to all of the parties to the transaction for signing.

Figure 4:
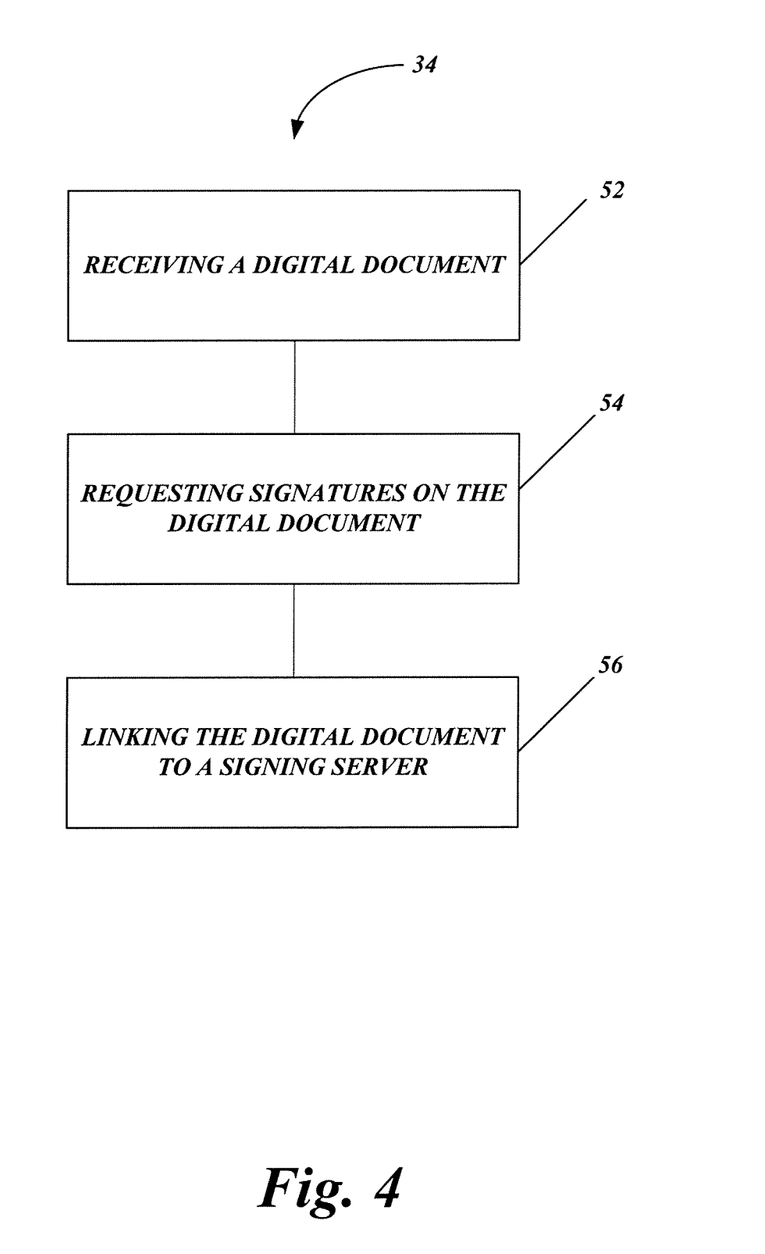
FIG. 4 is a flow diagram showing a preferred method for notifying a party to a transaction that the document is ready.

FIG. 4 is a flow diagram 34 showing a preferred method for notifying a party to a transaction that the document is ready. At block 52 a digital document is received. At block 54 signatures are requested on the digital document. At block 56, the digital document is linked to a signing server. The signing server is configured to secure the document and once signed and dated to store the document in its original form to create a legally defensible position that the document was signed and not altered in any way.

Figure 5:
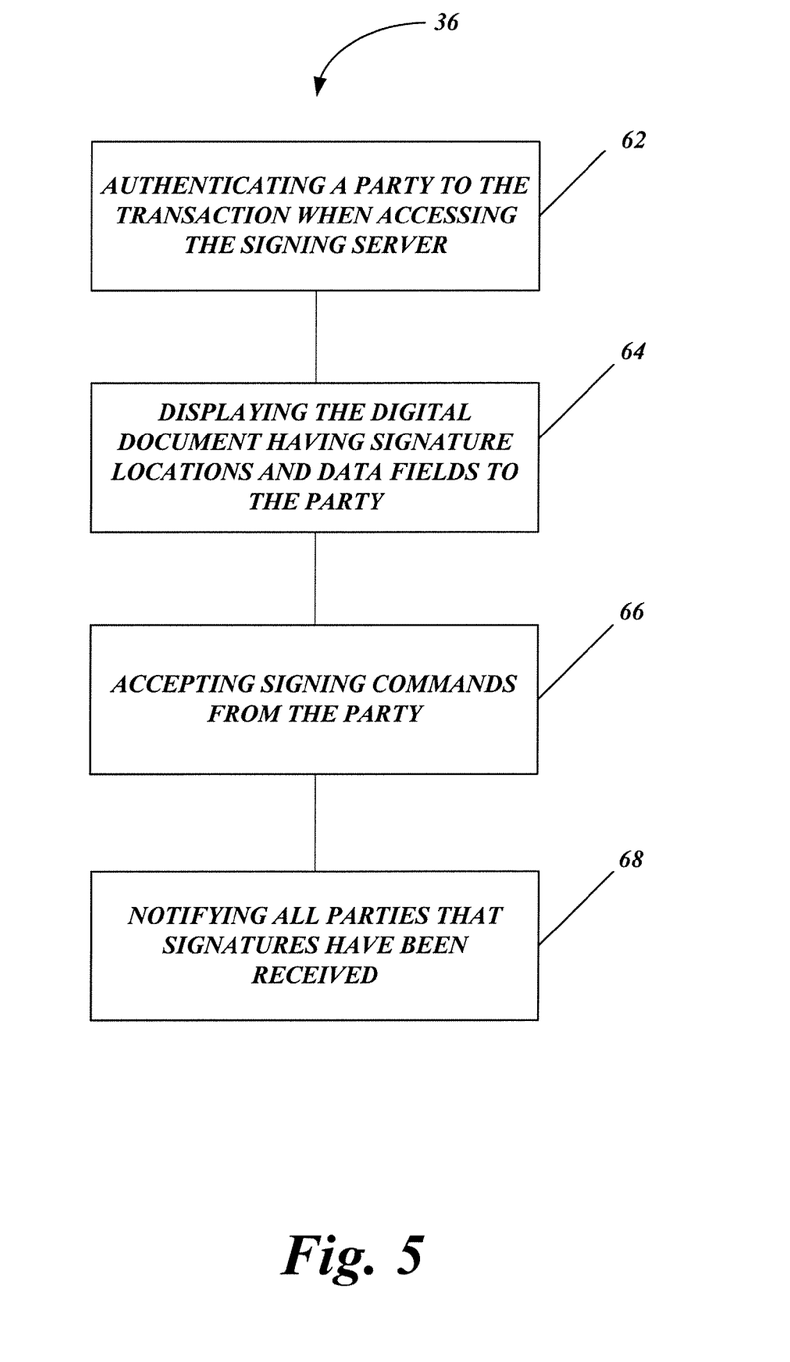
FIG. 5 is a flow diagram showing a preferred method for signing a digital document.
Figure 8:
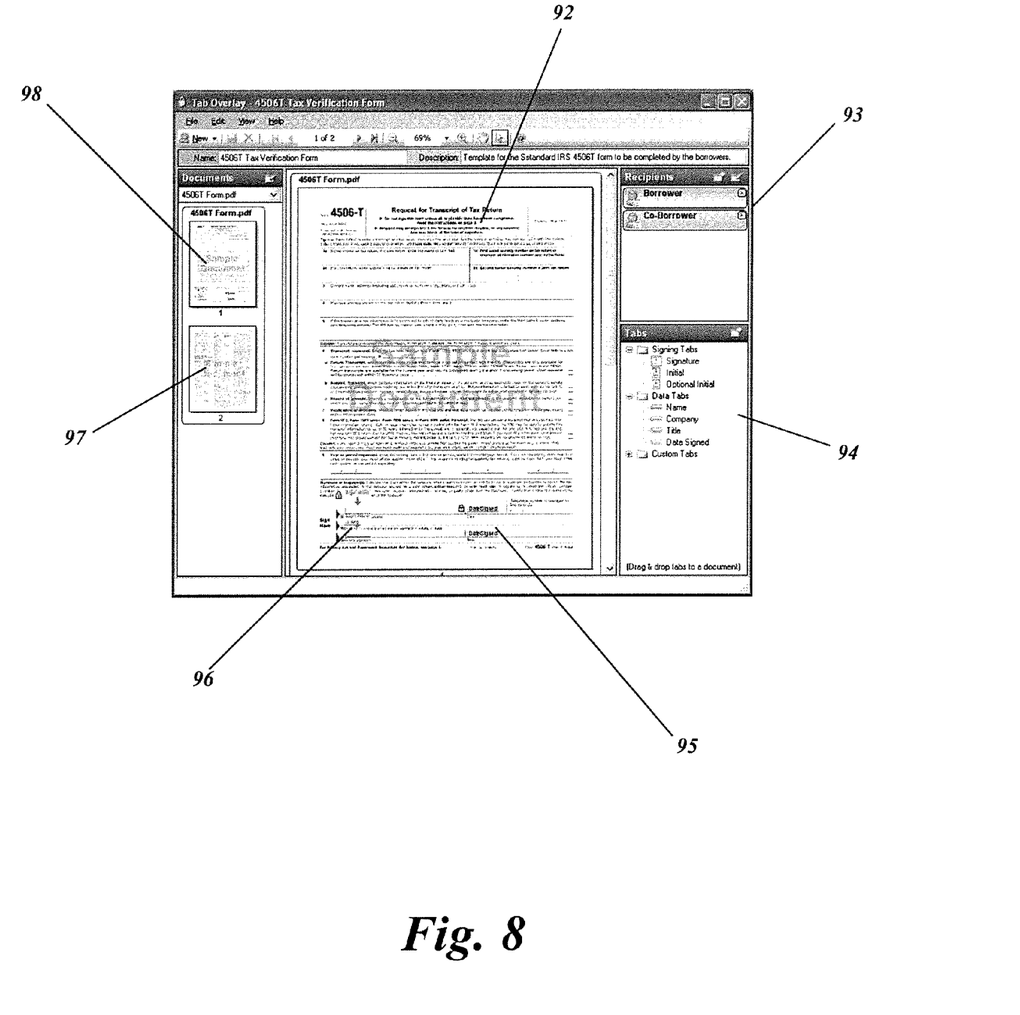

FIG. 5 is a flow diagram 36 showing a preferred method for signing a digital document. At block 62, a party to the transaction is authenticated when accessing the signing server. Authentication ensures that it was the person who is party to the transaction that signed the documents. Authentication may include, for example, email invitations, access codes given through "out of band" communications, and/or personal history questions. At block 64, the digital document is displayed to the party having signature locations and data fields. As shown in FIG. 8, for example, a document is displayed to the party and the area where a signature is requested is displayed with a tab that preferably states "sign here." At block 66, signing commands are accepted by the party. The party enters a digital signature onto the document which results in a signing command. At block 68, all parties are notified that signatures have been received and an executed document is available.

Figure 6:
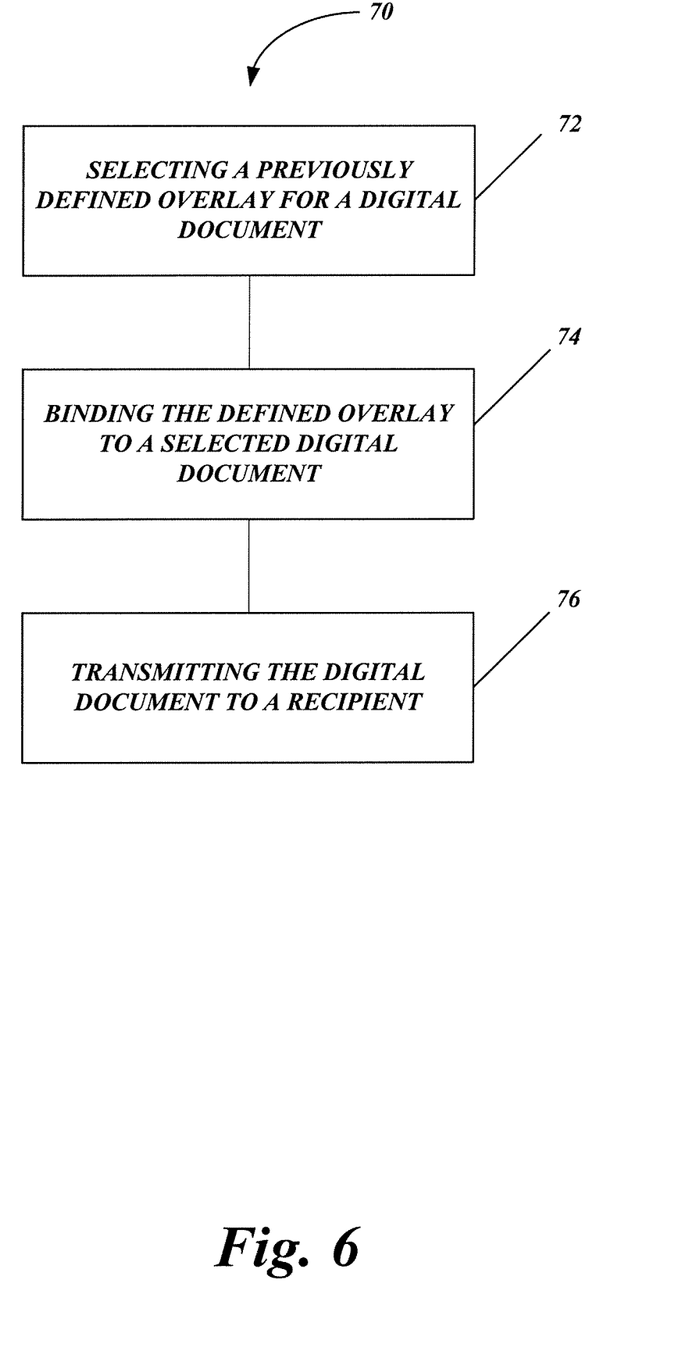
FIG. 6 is a flow diagram showing a preferred method of using a document overlay in one embodiment.

FIG. 6 is a flow diagram showing a method of using a document overlay in one embodiment. A document overlay is a template that is used for documents that do not usually change; for example, in an IRS form that only changes yearly. At block 72 a previously defined overlay for a digital document is selected to match the digital document of choice. At block 74 the defined overlay to the selected digital document is bound to the digital document. At block 76, the digital document is transmitted to the recipient.

Figure 7:
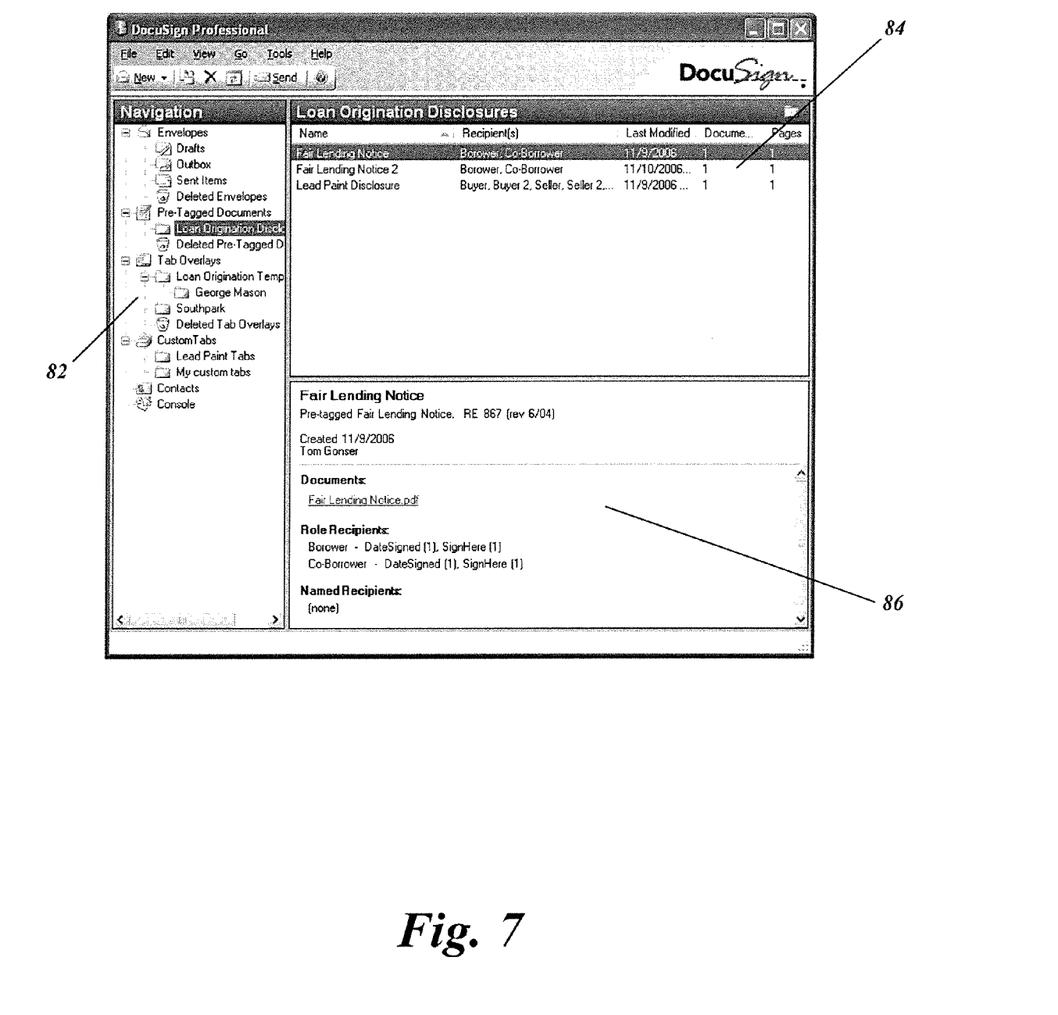
FIGS. 7-9 are screenshots of example graphical user interfaces presented by the system shown in FIG. 1 for performing the processes of FIGS. 2-6.
Figure 9:
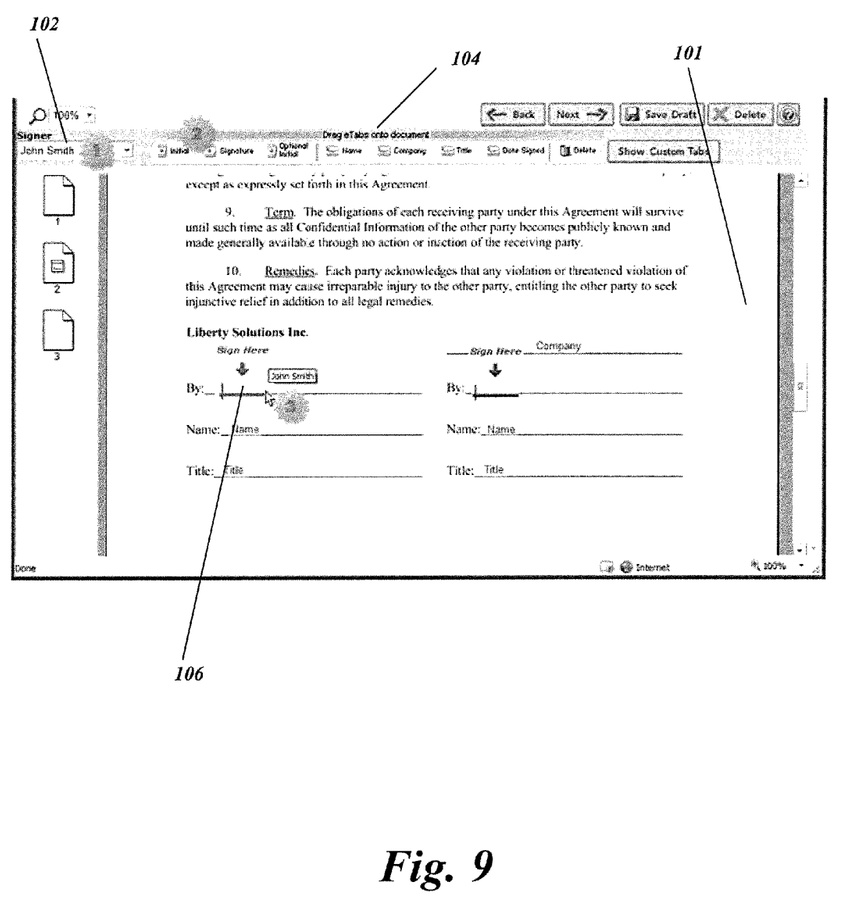

FIGS. 7-9 are screen shots of example graphical user interfaces presented by the preferred system shown in FIG. 1 for performing the processes of FIGS. 2-6. FIG. 7 shows a tab overlay for a digital document. A navigation pane 82 shows a series of documents that are envelopes, pre-tagged documents, or tab overlays. A document list 84 shows the documents to be signed; in this example loan origination disclosures are shown. A properties pane 86 shows the document, the creation date, and recipients. In this case the role of each recipient is defined and determines where each recipient would sign.

FIG. 8 shows a document review pane 92, which displays to a party to the transaction, the document that they are signing. The recipients pane 93, identifies the recipients and when selected shows where each recipient is requested to sign. The tabs pane 94 shows a list of tabs that are of interest to the recipient. Tabs include, but are not limited to, signature, initials, optional initials, name, company, title and/or date signed. A date signed tab is shown in area 95; the date signed is locked and is preferably entered by a signing server. A signature tab is shown in area 96: after review of the document a party may enter their signature. The current page of the document is shown in area 98, whereas the second page is shown in area 97. Additional pages would be shown as necessary.

FIG. 9 shows a screenshot of an exemplary portion of the preferred template development process of the present invention. A document pane 101 shows a user the document to be edited. A recipient/signer box 102 allows a user to define which recipient will sign in each area. A tabs box 104 shows a series of tabs that can be added to the document, including user designed custom tabs. A tab 106 is added to the document in preparation for sending the document to the recipient and asking the recipient to sign in that area.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for creating digitally tagged documents comprising:
   in a computing system,
      creating a data template for a digital document, the data template being separate from the digital document and defining intended signing events and workflow for signing the digital document, the workflow defining an order in which parties are to sign the digital document;
      assigning signature locations and data fields, the signature locations and data fields being part of the data template, each signature location specifying a horizontal and vertical pixel location on the digital document, thereby directing a party to sign the digital document at the pixel location on the digital document; and
      associating the data template with the digital document.

2. The method of claim 1, further comprising:
   selecting a previously defined overlay for the digital document; and
   associating the previously defined overlay with the digital document.

3. The method of claim 1, further comprising linking signature locations and data fields to a selected party to a transaction.

4. The method of claim 1, further comprising assigning recipient role information to the data template.

5. The method of claim 1, further comprising associating workflow instructions with the data template.

6. The method of claim 1, wherein the data template contains at least one of transaction owner information, authentication information for each recipient, tasks that a recipient will execute on the document, a list of signing tasks, a sequence of document delivery, location information regarding tabs within the document and data collection fields having checkboxes.

7. A system for creating digitally tagged documents comprising:
   a processor;
   a display; and
   a memory, the processor being in communication with the display and the memory, the memory further containing stored programming instructions operable by the processor to:
      create a data template for a digital document, the data template being separate from the digital document and defining intended signing events and workflow for signing the digital document, the workflow defining an order in which parties are to sign the digital document;
      assign signature locations and data fields, the signature locations and data fields being part of the data template, each signature location specifying a horizontal and vertical pixel location on the digital document, thereby directing a party to sign the digital document at the pixel location on the digital document; and
      associate the data template with the digital document.

8. The system of claim 7, further comprising programming instructions operable by the processor to:
   select a previously defined overlay for the digital document; and
   associate the previously defined overlay with the digital document.

9. The system of claim 7, further comprising programming instructions operable by the processor to link signature locations and data fields to a selected party to a transaction.

10. The system of claim 7, further comprising programming instructions operable by the processor to assign recipient role information to the data template.

11. The system of claim 7, further comprising programming instructions operable by the processor associate workflow instructions with the data template.

12. The system of claim 7, wherein the data template contains at least one of transaction owner information, authentication information for each recipient, tasks that a recipient will execute on the document, a list of signing tasks, a sequence of document delivery, location information regarding tabs within the document, and data collection fields having checkboxes.

13. The method of claim 1, further comprising:
   including in the data template a tab that is associated with a location on the digital document and that instructs a party to sign the digital document at the location.

14. The method of claim 1, wherein the data template includes multiple tabs that each instruct a party to sign the digital document at a corresponding pixel location, wherein the data template includes workflow instructions that specify an order in which the multiple tabs are to be signed, and further comprising:
   displaying one or more of the multiple tabs that are of interest to a party signing the digital document, wherein each of the one or more tabs is displayed at its corresponding pixel location on the digital document.

15. The method of claim 1, further comprising displaying a screen configured to facilitate development of the data template, the screen including:
   a recipient/signer box configured to allow a user to define which party will sign in each area of the digital document; and
   a tabs box configured to present a series of tabs that can be added to the digital document, each tab asking a party to sign the digital document at a corresponding location.

16. The system of claim 7, wherein the data template includes only signing instructions and does not include the digital document.

17. The system of claim 7, further comprising an application that enforces, based on the data template, the workflow for signing the digital document.

18. The method of claim 1, further comprising assigning a signature location that specifies location relative to text content in the digital document.

19. The method of claim 1, wherein the data template contains transaction owner information, authentication information for each recipient, tasks that each recipient will execute on the document, a sequence of document delivery, and pixel-based location information for tabs and data collection fields.

* * * * *